US011966371B1

(12) United States Patent
Jennings

(10) Patent No.: US 11,966,371 B1
(45) Date of Patent: Apr. 23, 2024

(54) SYSTEMS AND METHODS FOR AUTOMATED DATA DICTIONARY GENERATION AND VALIDATION

(71) Applicant: Wells Fargo Bank, N.A.

(72) Inventor: Connor Jennings, Des Moines, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 101 days.

(21) Appl. No.: 17/447,878

(22) Filed: Sep. 16, 2021

(51) Int. Cl.
  *G06F 16/21* (2019.01)
  *G06F 16/242* (2019.01)
  *G06F 40/226* (2020.01)
  *G06F 40/284* (2020.01)

(52) U.S. Cl.
  CPC .......... *G06F 16/211* (2019.01); *G06F 16/242* (2019.01); *G06F 40/226* (2020.01); *G06F 40/284* (2020.01)

(58) Field of Classification Search
  CPC .... G06F 16/211; G06F 16/242; G06F 40/226; G06F 40/284
  See application file for complete search history.

(56) References Cited

U.S. PATENT DOCUMENTS

| | | | | |
|---|---|---|---|---|
| 5,375,237 | A * | 12/1994 | Tanaka | G06F 16/9017 707/E17.037 |
| 7,222,136 | B1 | 5/2007 | Brown et al. | |
| 7,953,744 | B2 | 5/2011 | Charat et al. | |
| 8,239,426 | B2 | 8/2012 | Rangadass et al. | |
| 8,386,429 | B2 * | 2/2013 | Manis | G06F 16/211 707/640 |
| 8,676,829 | B2 | 3/2014 | Chen et al. | |
| 9,430,505 | B2 | 8/2016 | Padmanabhan et al. | |
| 9,785,715 | B1 * | 10/2017 | Busey | G06N 5/01 |
| 10,552,541 | B1 * | 2/2020 | Dreher | G06N 5/02 |
| 11,157,465 | B2 * | 10/2021 | Horowitz | G06F 16/215 |
| 2008/0052271 | A1 | 2/2008 | Lam | |
| 2008/0059443 | A1 | 3/2008 | Le Cam et al. | |
| 2008/0071817 | A1 * | 3/2008 | Gaurav | H04L 67/56 |

(Continued)

FOREIGN PATENT DOCUMENTS

| | | | | |
|---|---|---|---|---|
| CN | 104380663 A | * | 2/2015 | .......... G06F 11/3684 |
| CN | 104915383 B | | 9/2015 | |

OTHER PUBLICATIONS

Piotr Kononow, "Create a Data Dictionary with Dataedo, Dataedo Blog", Feb. 9, 2017, https://dataedo.com/blog/how-to-create-and-maintain-a-data-dictionary-with-dataedo (Year: 2017).*

(Continued)

*Primary Examiner* — Matthew J Ellis
(74) *Attorney, Agent, or Firm* — K&L Gates LLP

(57) ABSTRACT

Systems, apparatuses, methods, and computer program products are disclosed for automated generation and validation of a data dictionary. An example method includes automatically generating a data dictionary based on one or more reference term tokens of a database query. The example method further includes validating the data dictionary by generating, based on the database query and the data dictionary, a skeleton query, and determining, based on the skeleton query, a validation status of the data dictionary.

20 Claims, 8 Drawing Sheets

(56) References Cited

U.S. PATENT DOCUMENTS

2012/0191717 A1* 7/2012 Chen ................... G06F 16/285
707/E17.069
2019/0361843 A1* 11/2019 Stoddard ............ G06F 16/1834
2021/0224275 A1* 7/2021 Maheshwari .......... G06N 3/044

OTHER PUBLICATIONS

Piotr Kononow, Create a Data Dictionary with Dataedo, Dataedo Blog, Feb. 9, 2017, https://dataedo.com/blog/create-data-dictionary-with-dataedo-tutorial.

* cited by examiner

| Database | Table | Column | Description |
|---|---|---|---|
| CustomerInfo | Customer | name | The name of the customer |
| CustomerInfo | Customer | socsecnum | Customer social security number |
| CustomerInfo | Credit_Info | credit_score | Credit Score |
| CustomerInfo | Credit_Info | SSN | Customer social security number |

418 — columns labeled 410, 412, 414, 416

FIG. 4B

| Database | Table | Column | Description |
|---|---|---|---|
| | | name | |
| CustomerInfo | Customer | socsecnum | Customer social security number |
| CustomerInfo | Credit_Info | credit_score | Credit Score |
| CustomerInfo | Credit_Info | SSN | Customer social security number |

420 — columns labeled 410, 412, 414, 416

FIG. 4C

| Database | Table | Column | Description |
|---|---|---|---|
| CustomerInfo | Customer | * | |
| CustomerInfo | Customer | socsecnum | Customer social security number |
| CustomerInfo | Credit_Info | credit_score | Credit Score |
| CustomerInfo | Credit_Info | SSN | Customer social security number |

422 — columns labeled 410, 412, 414, 416

FIG. 4D

SYSTEMS AND METHODS FOR AUTOMATED DATA DICTIONARY GENERATION AND VALIDATION

BACKGROUND

Documentation of particular data used in a data science project is important and often required for projects utilizing a large amount of data stored in a database. In some examples, data dictionaries can be used to document data and may include information such as names of database tables and columns pertaining to a project. However, gathering this information and confirming that the data dictionary contains all necessary information is typically performed manually, resulting in a tedious process prone to errors.

BRIEF SUMMARY

In data science, data is commonly collected in order to perform one or more tasks, such as creating a model, generating a dashboard visualization of the data, generating reports, and/or the like. Since these tasks may require a large amount of data, aspects of the collected data are often documented in a data dictionary. For example, a data dictionary may include names of tables and/or columns of a database from which the data was collected.

Data dictionaries are useful for a number of reasons. For example, data dictionaries assist in avoiding data inconsistencies across a project, define conventions that are to be used in the project, provide consistency in the collection and use of data across multiple members of a team, make data easier to analyze, and enforce the use of standards. Data dictionaries can also be particularly useful during a transfer of data between environments. For example, data from older, locally stored databases may need to be collected and moved to a cloud computing environment in which large machine learning (ML) models can be created using the data. In moving the data, it is necessary to know precisely what data needs to be moved in order to avoid missing data for the project and similarly, to avoid burdening networks and/or storage by uploading unnecessary, extra data. In this regard, a data dictionary can serve as a check on the exact columns and/or tables which are needed from the database. For example, an incorrect data dictionary that is missing necessary column information can result in an ML model outputting anomalous results by failing to utilize all necessary data. Incorrect data dictionaries are especially problematic in situations in which a system using the ML model has already been put into production and a pipeline of live, continuous data collection from the database has been built, resulting in extensive maintenance to fix the system.

Conventionally, generation and validation of data dictionaries has been a process reliant on manual entry of information into the data dictionary as well as manual review to validate whether the data dictionary is correct and includes all required information. However, this process is both time-consuming and extremely prone to human error.

Accordingly, the inventors have realized that a need exists for new solutions that improve upon traditional processes for both creating and validating data dictionaries and that address the various issues noted above. Example methods, apparatuses, and computer program products are disclosed herein for automated generation and validation of data dictionaries. To do this, example embodiments leverage a database query used to retrieve data from a database to both automatically generate a data dictionary and subsequently validate the automatically generated data dictionary and/or other previously created data dictionaries associated with the database query. In this regard, example embodiments described herein provide for a faster, lighter, and more efficient approach to data dictionary generation and validation and significantly reduce the risk of human error historically incurred when generating and validating data dictionaries.

In one example embodiment, a method is provided for automated data dictionary generation and validation. The method includes receiving, by communications circuitry, a first data dictionary. The method also includes parsing, by data dictionary generation circuitry, a database query and identifying, by the data dictionary generation circuitry and based on the parsing of the database query, one or more reference term tokens. The method further includes automatically generating, by the data dictionary generation circuitry, a second data dictionary based on the one or more reference term tokens, validating, by data dictionary validation circuitry, the first data dictionary based on the second data dictionary, and causing, by the data dictionary validation circuitry, presentation of a validation status of the first data dictionary.

In another example embodiment, an apparatus is provided for automated data dictionary generation and validation. The apparatus includes communications circuitry configured to receive a first data dictionary. The apparatus also includes data dictionary generation circuitry configured to parse a database query, identify, based on the parsing of the database query, one or more reference term tokens, and automatically generate a second data dictionary based on the one or more reference term tokens. The apparatus further includes data dictionary validation circuitry configured to validate the first data dictionary based on the second data dictionary and cause presentation of a validation status of the first data dictionary.

In another example embodiment, a computer program product is provided for automated data dictionary generation and validation. The computer program product includes at least one non-transitory computer-readable storage medium storing software instructions that, when executed, cause an apparatus to receive a first data dictionary. The software instructions, when executed, further cause the apparatus to parse a database query and identify, based on the parsing of the database query, one or more reference term tokens. The software instructions, when executed, further cause the apparatus to automatically generate a second data dictionary based on the one or more reference term tokens. The software instructions, when executed, further cause the apparatus to validate the first data dictionary based on the second data dictionary and cause presentation of a validation status of the first data dictionary.

In another example embodiment, a method is provided for automated data dictionary validation. The method includes automatically generating, by data dictionary generation circuitry, a data dictionary based on one or more reference term tokens of a database query. The method further includes validating, by data dictionary validation circuitry, the data dictionary. The validating of the data dictionary includes generating, by a skeleton query generator and based on the database query and the data dictionary, a skeleton query. The validating of the data dictionary also includes determining, by the data dictionary validation circuitry and based on the skeleton query, a validation status of the data dictionary.

In another example embodiment, an apparatus is provided for automated data dictionary validation. The apparatus includes data dictionary generation circuitry configured to automatically generate a data dictionary based on one or more reference term tokens of a database query. The apparatus further includes data dictionary validation circuitry configured to validate the data dictionary. The validating of the data dictionary by the data dictionary validation circuitry includes generating, by a skeleton query generator and based on the database query and the data dictionary, a skeleton query. The validating of the data dictionary by the data dictionary validation circuitry also includes determining, by the data dictionary validation circuitry and based on the skeleton query, a validation status of the data dictionary.

In another example embodiment, a computer program product is provided for automated data dictionary validation. The computer program product includes at least one non-transitory computer-readable storage medium storing software instructions that, when executed, cause an apparatus to automatically generate a data dictionary based on one or more reference term tokens of a database query. The software instructions, when executed, further cause the apparatus to validate the data dictionary. The software instructions configured to validate the data dictionary are further configured to generate, based on the database query and the data dictionary, a skeleton query. The software instructions configured to validate the data dictionary are further configured to determine, by the data dictionary validation circuitry and based on the skeleton query, a validation status of the data dictionary.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 4B illustrates an example representation of a data dictionary, in accordance with some example embodiments described herein.

FIG. 4C illustrates an example representation of a data dictionary, in accordance with some example embodiments described herein.

FIG. 4D illustrates an example representation of a data dictionary, in accordance with some example embodiments described herein.

DETAILED DESCRIPTION

Figure 1:
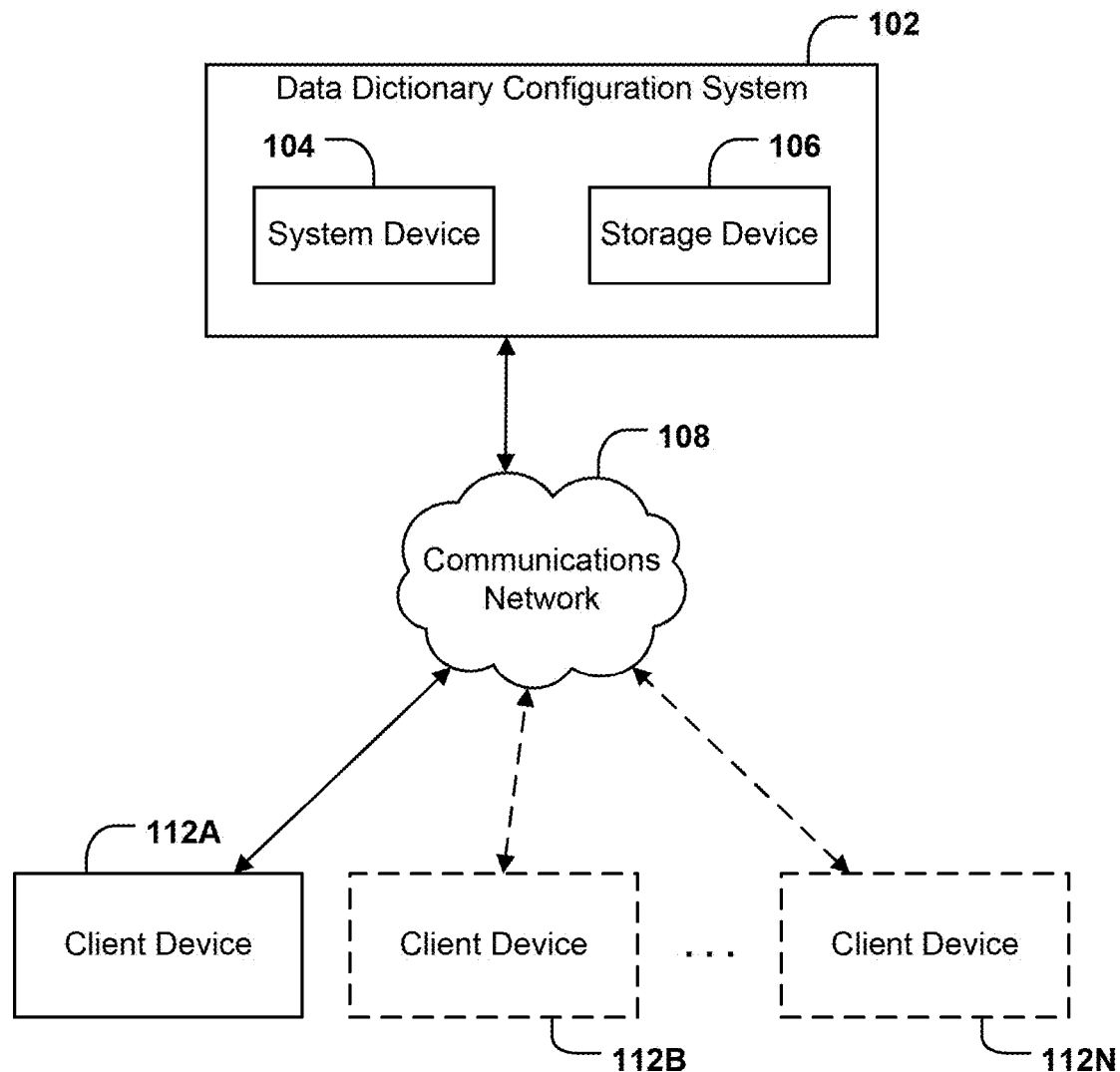
FIG. 1 illustrates a system in which some example embodiments may be used for automated generation and validation of data dictionaries in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "database query" refers to a textual string of code, that, when executed, is configured to query a database and return data specified by the database query. A database query may include textual tokens including native term tokens and reference term tokens.

A "native term token" refers to a token such as a command, filter value, or the like that is native (e.g., built-in) to the programming language used to create the database query. For example, in some embodiments, a database query is a Structured Query Language (SQL) database query that is written in SQL. In this regard, native term tokens of an SQL database query may include commands such as "FROM," "SELECT," "JOIN," and filter values such as ">10," "in (142, 341)," or the like.

A "reference term token" refers to a token that references one or more user-defined and/or custom names associated with a particular database which the database query is configured to query. For example, a reference term token may include a name of a data source, a name of a field, and/or a combination of a data source name and a field name. In example embodiments in which a database comprises a table structure, a "data source" refers to a particular table of the database, and a "field" refers to a particular column of the table. For instance, an example reference term token of an SQL database query, "Customer.name," includes a reference to a data source (e.g., a table, "Customer") and a field (e.g., a column of the table, "name") separated by a delimiter character (e.g., a period).

A "skeleton query" refers to a database query having undergone a removal of certain elements from the database query, thus resulting in a "skeleton" of the original database query comprising a portion of the original database query or, in some embodiments, an empty database query (e.g., a removal of all elements in the database query). For example, as further described below, one or more reference term tokens and/or native term tokens may be removed from a database query to generate a skeleton query. Generation of a skeleton query is further described below in connection with FIG. 7.

Though example embodiments describe database queries in the context of SQL, it is to be appreciated that database queries written in languages other than SQL may be used to carry out example operations described below.

Overview

As noted above, methods, apparatuses, systems, and computer program products are described herein that provide for automated generation and validation of data dictionaries. Traditionally, as both the generation and the validation of data dictionaries have been performed manually, it has been very difficult and time-consuming to both create data dictionaries and to ensure the data dictionaries contain all necessary information. In addition, there has been typically no way to automate the generation and validation of data dictionaries.

In contrast to these conventional, manual techniques for data dictionary generation and validation, example embodiments described herein automatically generate and validate data dictionaries through use of a database query used to retrieve data from a database. In some embodiments, a previously created data dictionary (e.g., a manually created data dictionary) is checked against a data dictionary having been automatically generated by leveraging the database query to confirm the previously generated data dictionary is accurate. In some embodiments, a skeleton query is generated in order to subsequently confirm an automatically generated data dictionary includes all necessary and intended information.

Accordingly, the present disclosure sets forth systems, methods, and apparatuses that achieve efficient automation of data dictionary generation and validation. There are many advantages of these and other embodiments described herein. For instance, a faster, lighter, and more efficient approach to data dictionary generation and validation is provided by removing the need for time-consuming manual creation and review of data dictionaries. As a result, a significant reduction in the risk of error historically incurred when generating and validating data dictionaries is realized.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a data dictionary configuration system 102 may include a system device 104 in communication with a storage device 106. Although system device 104 and storage device 106 are described in singular form, some embodiments may utilize more than one system device 104 and/or more than one storage device 106. Additionally, some embodiments of the data dictionary configuration system 102 may not require a storage device 106 at all. Whatever the implementation, the data dictionary configuration system 102, and its constituent system device(s) 104 and/or storage device (s) 106 may receive and/or transmit information via communications network 108 (e.g., the Internet) with any number of other devices, such as one or more client devices 112A, 112B, through 112N.

System device 104 may be implemented as one or more servers, which may or may not be physically proximate to other components of the data dictionary configuration system 102. Furthermore, some components of system device 104 may be physically proximate to the other components of the data dictionary configuration system 102 while other components are not. System device 104 may receive, process, generate, and transmit data, signals, and electronic information to facilitate the operations of the data dictionary configuration system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the data dictionary configuration system 102. Storage device 106 may store information relied upon during operation of the data dictionary configuration system 102, such as various database queries that may be used by the data dictionary configuration system 102, data and documents to be analyzed using the data dictionary configuration system 102, or the like. In addition, storage device 106 may store control signals, device characteristics, and access credentials enabling interaction between the data dictionary configuration system 102 and one or more of the client devices 112A-112N.

The one or more client devices 112A-112N may be embodied by any computing devices known in the art, such as desktop or laptop computers, tablet devices, smartphones, or the like. The one or more client devices 112A-112N need not themselves be independent devices, but may be peripheral devices communicatively coupled to other computing devices.

Although FIG. 1 illustrates an environment and implementation in which the data dictionary configuration system 102 interacts with one or more of client devices 112A, 112B, through 112N, in some embodiments users may directly interact with the data dictionary configuration system 102 (e.g., via input/output circuitry of system device 104), in which case a separate client device 112A may not be utilized. Whether by way of direct interaction or via a separate client device 112A, a user may communicate with, operate, control, modify, or otherwise interact with the data dictionary configuration system 102 to perform the various functions and achieve the various benefits described herein.

Example Implementing Apparatuses

Figure 2:
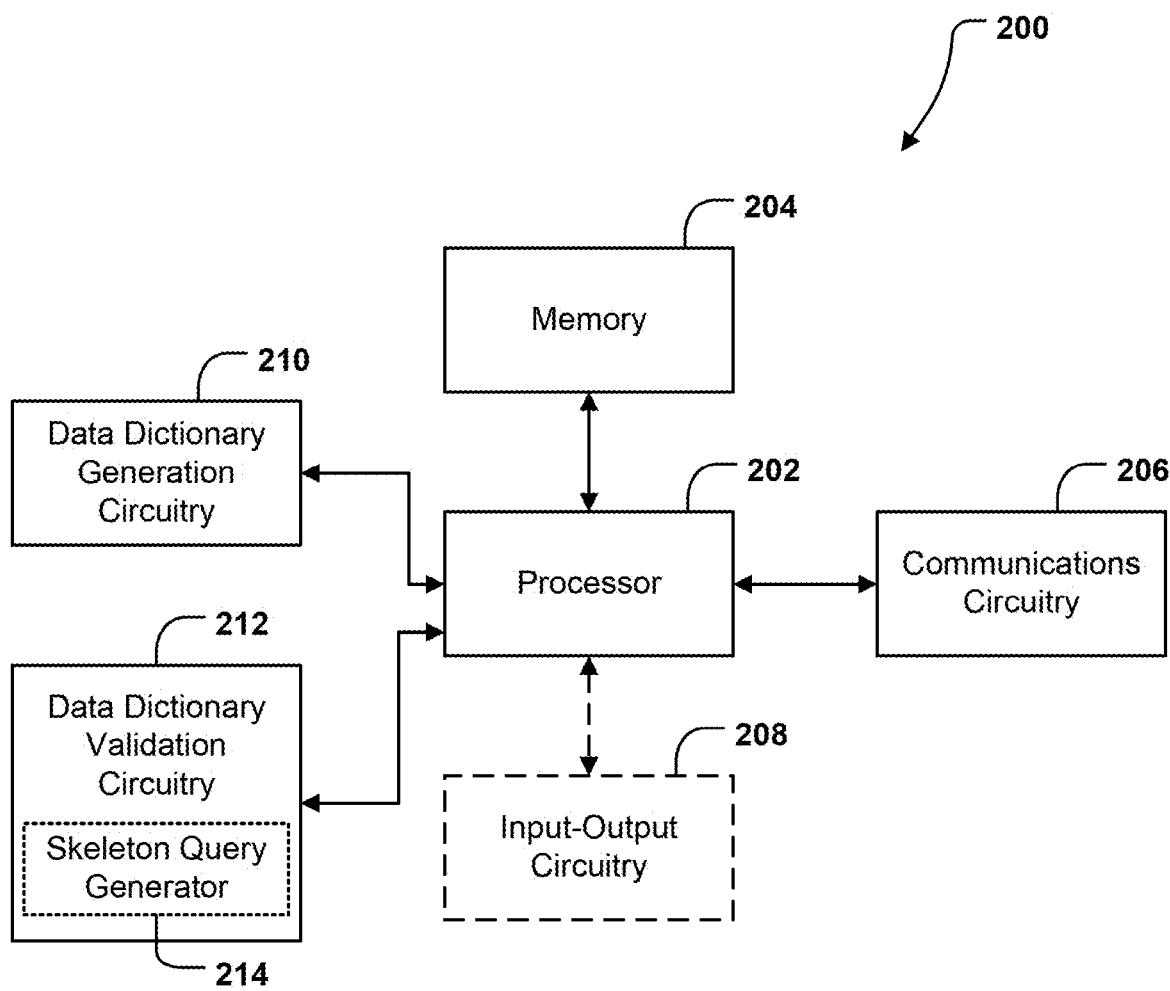
FIG. 2 illustrates a schematic block diagram of example circuitry embodying a device that may perform various operations in accordance with some example embodiments described herein.

System device 104 of the data dictionary configuration system 102 (described previously with reference to FIG. 1)

may be embodied by one or more computing devices or servers, shown as apparatus 200 in FIG. 2. As illustrated in FIG. 2, the apparatus 200 may include processor 202, memory 204, communications circuitry 206, input-output circuitry 208, data dictionary generation circuitry 210, data dictionary validation circuitry 212, and skeleton query generator 214, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3, 4A, and 5-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processor for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a client device 112 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises data dictionary generation circuitry 210 configured to automatically generate a data dictionary. The data dictionary generation circuitry 210 may utilize processor 202, memory 204, or any other hardware component included in the apparatus 200 to perform these operations, as described in connection with FIGS. 3, 4A, and 6 below. The data dictionary generation circuitry 210 may further utilize communications circuitry 206 to gather data from a variety of sources (e.g., storage device 106, as shown in FIG. 1), may utilize input-output circuitry 208 to receive data, and in some embodiments may utilize processor 202 and/or memory 204 to split reference term tokens and store information in a data dictionary.

In addition, the apparatus 200 further comprises data dictionary validation circuitry 212 configured to automatically validate a data dictionary. The data dictionary validation circuitry 212 may utilize processor 202, memory 204, or any other hardware component included in the apparatus 200 to perform these operations, as described in connection with FIGS. 5-7 below. The data dictionary validation circuitry 212 may further utilize communications circuitry 206 to gather data from a variety of sources (e.g., storage device 106, as shown in FIG. 1), may utilize input-output circuitry 208 to receive data, and in some embodiments may utilize processor 202 and/or memory 204 to determine a validation status of a data dictionary.

Finally, the apparatus 200 may also comprise a skeleton query generator 214 that generates a skeleton query based on a database query and a data dictionary. In some embodiments, the skeleton query generator 214 may be a component of the data dictionary validation circuitry 212, as shown in FIG. 2. The skeleton query generator 214 may utilize processor 202, memory 204, or any other hardware component included in the apparatus 200 to perform these operations, as described in connection with FIG. 7 below. The skeleton query generator 214 may further utilize communications circuitry 206 to gather data from a variety of sources (e.g., storage device 106, as shown in FIG. 1), and in some embodiments may utilize processor 202 and/or memory 204 to generate a skeleton query.

Although components 202-214 are described in part using functional language, it will be understood that the particular implementations necessarily include the use of particular hardware. It should also be understood that certain of these components 202-214 may include similar or common hardware. For example, the data dictionary generation circuitry 210, data dictionary validation circuitry 212, and the skeleton query generator 214 may each at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the data dictionary generation circuitry 210, data dictionary validation circuitry 212, and the skeleton query generator 214 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the data dictionary generation circuitry 210, data dictionary validation circuitry 212, and the skeleton query generator 214 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatuses 200, example embodiments are described below in connection with a series of flowcharts.

Example Operations

Turning to FIGS. 3, 4A, and 5-7, example flowcharts are illustrated that contain example operations implemented by example embodiments described herein. The operations illustrated in FIGS. 3, 4A, and 5-7 may, for example, be performed by system device 104 of the data dictionary configuration system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, the data dictionary generation circuitry 210, data dictionary validation circuitry 212, the skeleton query generator 214, and/or any combination thereof. It will be understood that user interaction with the data dictionary configuration system 102 may occur directly via input-output circuitry 208, or may instead be facilitated by a separate client device 112A, as shown in FIG. 1, and which may have similar or equivalent physical componentry facilitating such user interaction.

Figure 3:
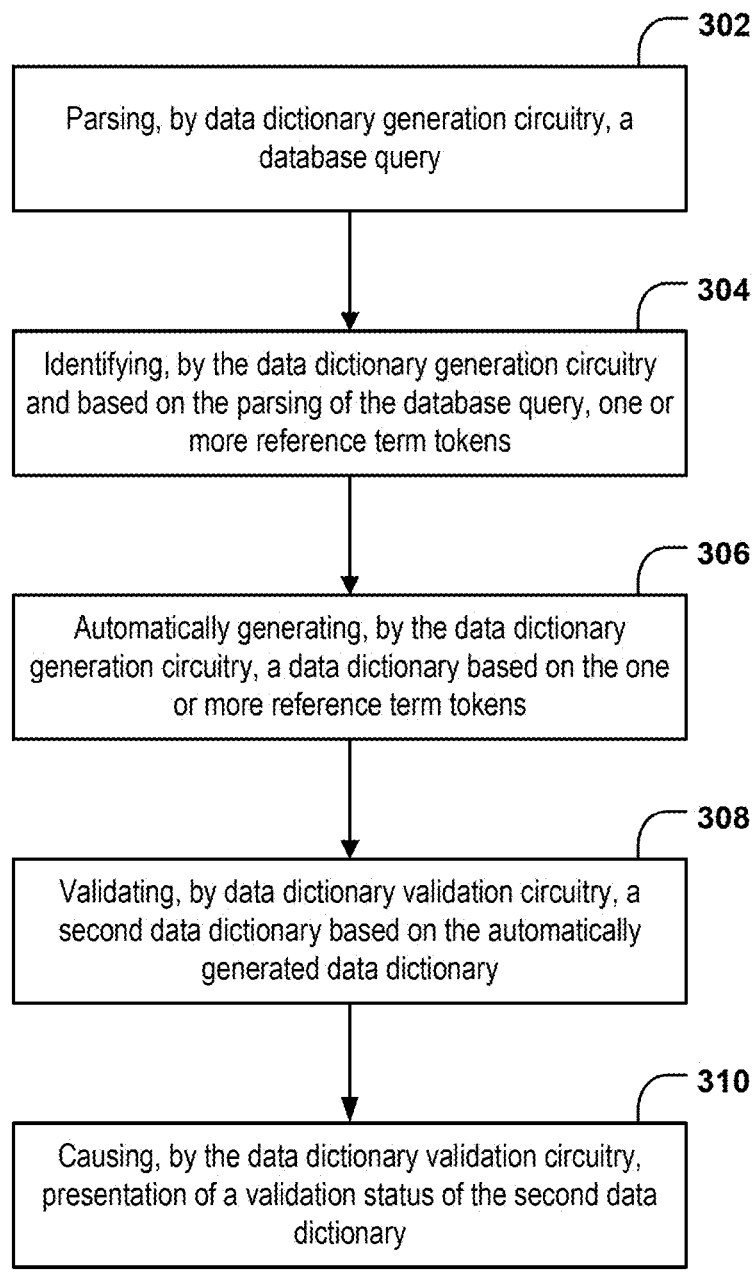
FIG. 3 illustrates an example flowchart for automated generation and validation of a data dictionary, in accordance with some example embodiments described herein.

Turning first to FIG. 3, example operations are shown for automated generation and validation of a data dictionary.

In some embodiments, a database query may be accessed, received, retrieved, or otherwise obtained by the apparatus 200. In some embodiments, the database query may be a database query used in a project, such as a data science project, to collect data from a database to use in the project. In this regard, the apparatus 200 includes means, such as input-output circuitry 208, communications circuitry 206, memory 204, processor 202, and/or the like, for obtaining a database query. The database query may be obtained in a variety of ways. Most typically, a database query may be stored (e.g., in storage device 106, memory 204, a cloud platform, or the like) and retrieved by the apparatus 200. However, in some embodiments, a user may interact directly with the data dictionary configuration system 102, in which case the survey may be received via input-output circuitry 208 of an apparatus 200 comprising system device 104 of the data dictionary configuration system 102. It is conceivable that a user may interact with the data dictionary configuration system 102 via multiple separate devices (e.g., client devices 112A-N). To this end, a user may access a secure website hosted by the data dictionary configuration system 102 via a browser, and may thus interact with the data dictionary configuration system 102, such as by providing a database query to the data dictionary configuration system 102 via communications circuitry 206.

As shown by operation 302, the apparatus 200 includes means, such as processor 202, memory 204, data dictionary generation circuitry 210, or the like, for parsing a database query.

In some embodiments, the data dictionary generation circuitry 210 is used to parse the database query. In parsing the database query, tokens (e.g., reference term tokens and native term tokens) of the database query may be identified and classified as either a reference term token or a native term token. Tokens may be identified in a variety of manners. As one example, the data dictionary generation circuitry 210 may compare a token of the database query against a collection of known native term tokens to determine whether the token is a reference term token or a native term token. As shown by operation 304, the apparatus 200 includes means, such as processor 202, memory 204, data dictionary generation circuitry 210, or the like, for identifying, based on the parsing of the database query, one or more reference term tokens. In this regard, for example, if the token is determined to be not included in the collection of native term tokens, the token may be identified a reference term token.

As shown by operation 306, the apparatus 200 includes means, such as processor 202, memory 204, data dictionary generation circuitry 210, or the like, for automatically generating a data dictionary based on the one or more reference term tokens.

In some embodiments, the data dictionary may be generated as a table data structure. Though example embodiments herein describe a data dictionary as having a table structure, it is to be appreciated that a data dictionary may comprise other structures as well and is not limited to having a table structure. Regardless of what type of data structure the data dictionary may be generated in, the data dictionary comprises a number of fields and entries. For example, in embodiments in which the data dictionary is generated in a table structure, the data dictionary may comprise a number of columns (e.g., fields) and rows (e.g., entries).

In some embodiments, a data dictionary comprises at least two fields. The at least two fields comprise a data source-referencing field and a field-referencing field. For example, in an embodiment in which the data dictionary is automatically generated in a table structure, the data source-referencing field is a "Table" column comprising indications of table names and the field-referencing field is a "Column" column comprising indications of column names.

In some embodiments, the data dictionary may be generated with additional fields. As one example, as shown in FIG. 4B, an example data dictionary comprises a "Database" field 410 and a "Description" field 416, in addition to the data source-referencing field 412 (e.g., the "Table" column) and the field-referencing field 414 (e.g., the "Column" column). As shown, for example, for a respective entry in the data dictionary, the "Database" field 410 provides a reference to a name of a particular database which contains the column and table referenced in the respective entry. Further, for a respective entry in the data dictionary, the "Description" field 416 provides a textual description of data stored in the column and/or table referenced in the respective entry. For example, an example data dictionary may be generated with the "Description" field 416 having unfilled or blank entries which a user can later edit upon review of the data dictionary.

Figure 4A:
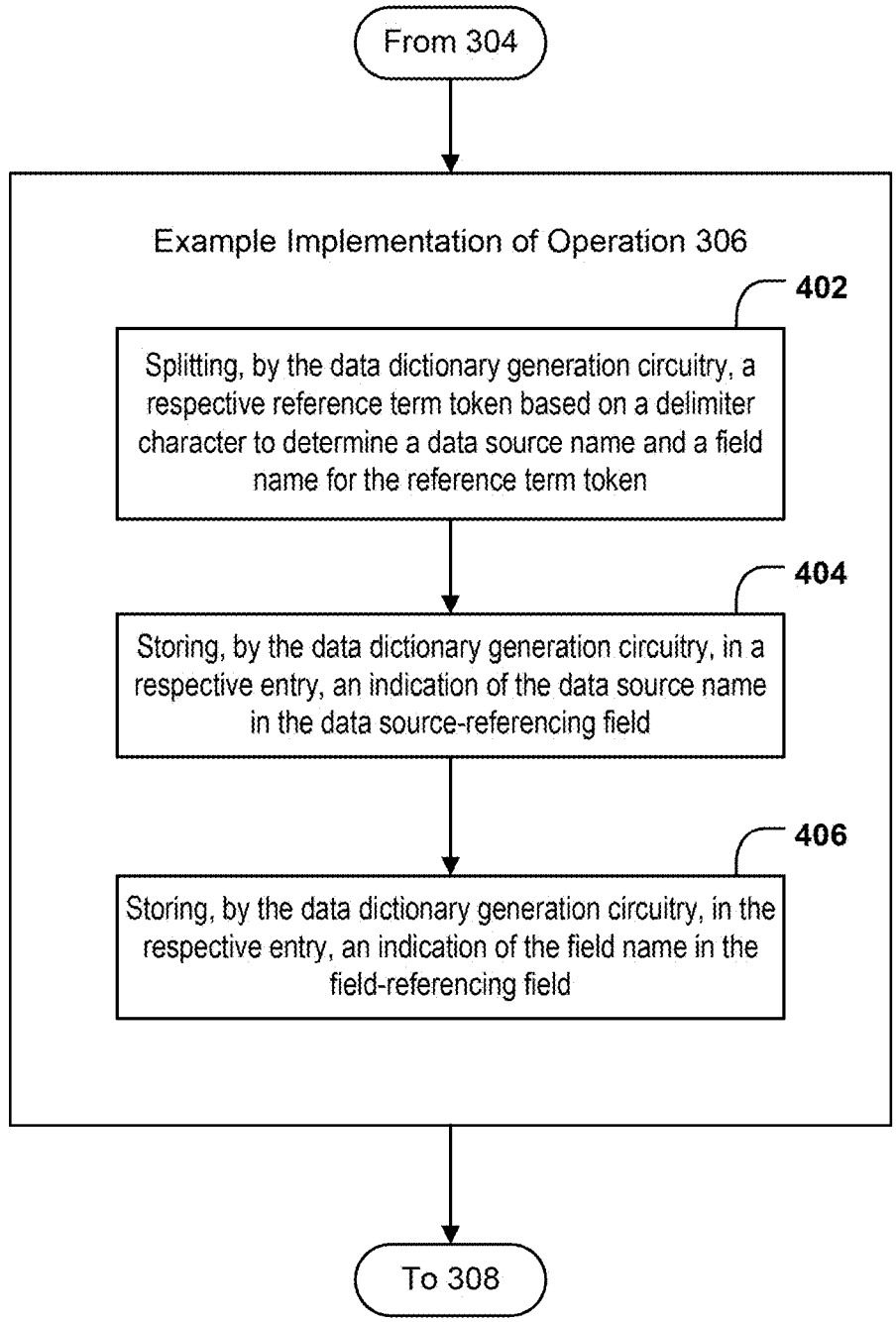
FIG. 4A illustrates an example flowchart for automatically generating a data dictionary based on one or more reference term tokens, in accordance with some example embodiments described herein.

Turning briefly to FIG. 4A, example operations for automatically generating the data dictionary based on the one or more identified reference term tokens are shown.

As shown by operation 402, the apparatus 200 includes means, such as processor 202, memory 204, data dictionary generation circuitry 210, or the like, for splitting a respective reference term token based on a delimiter character to determine a data source name and a field name for the reference term token.

For example, for a respective identified reference term token, the data dictionary generation circuitry 210 may identify a data source name and/or a field name which the reference term token refers by splitting the reference term token based on a delimiter character in the reference term token. For example, an example reference term token, "Customer.name" may be determined to comprise a data source (e.g., table) name, "Customer" and a field (e.g., column) name, "name," based on the delimiter character (e.g., the period) in the example reference term token. In some embodiments, a term to the left of the delimiter character may be identified as a data source name, and a term to the right of the delimiter character may be identified as a field name.

As shown by operation 404, the apparatus 200 includes means, such as processor 202, memory 204, data dictionary generation circuitry 210, or the like, for storing an indication of the data source name in the data source-referencing field. In this regard, once a data source (e.g., table) name is identified in a particular reference term token based on the delimiter character, the data dictionary generation circuitry 210 may store, in an entry for the particular reference term token, an indication of the data source name in the data source-referencing field. For example, for the example "Customer.name" reference term token, an indication of "Customer" may be stored in the "Table" column, as shown in the top entry 418 of the example data dictionary in FIG. 4B.

As shown by operation 406, the apparatus 200 includes means, such as processor 202, memory 204, data dictionary generation circuitry 210, or the like, for storing an indication of the field name in the field-referencing field. In this regard, once a field (e.g., column) name is identified in a particular reference term token based on the delimiter character, the data dictionary generation circuitry 210 may store, in an entry for the particular reference term token, an indication of the field name in the field-referencing field. Continuing with the above example, for the example "Customer.name" reference term token, an indication of "name" may be stored in the "Column" column, as shown in the top entry 418 of the example data dictionary in FIG. 4B.

In some circumstances, a reference term token may not comprise a delimiter character, and instead may only refer a field name. For example, if a field name is unique for all data sources referenced in a database query, the data source name may not be required to be included in the reference term token. Said differently, for a database query written in SQL, if no other tables referenced in the database query besides "Customer" contain a column called "name," the reference term token may simply be written as "name," rather than "Customer.name."

In such a situation, the data dictionary generation circuitry 210 may generate a data dictionary having an entry with only the field-referencing field filled, e.g., as shown in the top entry 420 of FIG. 4C. In this regard, the apparatus 200 includes means, such as processor 202, memory 204, data dictionary generation circuitry 210, or the like, for, in an instance in which the respective reference term token does not comprise a data source name, storing an indication of a missing data source name in the data source-referencing field. As shown in the top entry 418 of the example data dictionary in FIG. 4C, the indication of a missing data source name in the data source-referencing field may be a blank entry. In another embodiment, the indication of a missing data source name in the data source-referencing field may be text, such as, for example, "MISSING" or "INPUT NEEDED," indicating to a user that the entry must be completed manually. To further alert the user, in some embodiments, the apparatus 200 includes means, such as processor 202, memory 204, data dictionary generation circuitry 210, or the like, for relocating the respective entry as a first entry of the data dictionary. In this regard, entries with missing data source names may be relocated to the top of the data dictionary such that a user can quickly identify what information may be missing from the automatically generated data dictionary.

In some circumstances, a reference term token may not comprise a field name. For example, an example reference term token "Customer.*" in a database query written in SQL comprises a select star (e.g., an asterisk "*") indicating a selection of all columns from the "Customer" table. In such a situation, the data dictionary generation circuitry 210 may generate a data dictionary having an entry comprising an indication of the selection of all columns in the field-referencing field. For example, as shown in FIG. 4D, the reference term token "Customer.*" may result in an entry 422 referencing the database name (e.g., "CustomerInfo) and table (e.g., "Customer") while also referencing an indication of the selection of all columns (e.g., "*") in the field-referencing field (e.g., "Column"). Additionally, in some embodiments, to further alert the user, entries comprising an indication of the selection of all columns may also be relocated to the top of the data dictionary for efficient user review.

In some embodiments, an example database query may assign an alias to one or more data sources for improved readability and/or more efficient drafting of the database query. For example, an example SQL query may use a native term token "as" to assign an alias to a particular table, resulting in example code such as "JOIN Credit Info as cred ON cred.SSN." In this regard, a table named "Credit Info" may then be referred to throughout the remainder of the database query merely as "cred," as seen, for example, in the reference term token "cred.SSN" in the above example code. In situations in which an alias for a data source is used in a database query, when automatically generating a data dictionary, the apparatus 200 includes means, such as processor 202, memory 204, data dictionary validation circuitry 212, or the like, for converting an alias to a data source name prior to storing an indication of the data source name in the data source-referencing field.

For example, the data dictionary generation circuitry 210 may identify the native term token "as" when parsing the database query (e.g., as described in operation 302 of FIG. 3) and determine that a term to the left of "as" is a data source name and a term to the right of "as" is an alias of that data source name. The data source name and the associated alias may then be temporarily stored (e.g., in memory 204) and referred back to while parsing the remainder of the database query. For example, when a reference term token is identified and split (e.g., as described in operation 402 of FIG. 4A), the data dictionary generation circuitry 210 may perform a check on the identified data source name (e.g., the term to the left of the delimiter character) to determine whether the identified data source name is an alias and if so, converting the alias to a data source name and storing the data source name in the data source-referencing field of the data dictionary.

Returning to FIG. 3, as shown by operation 308, the apparatus 200 includes means, such as processor 202, memory 204, data dictionary validation circuitry 212, or the like, for validating a second data dictionary based on the automatically generated data dictionary.

For example, once a data dictionary has been automatically generated as described above, a second data dictionary may be validated using the automatically generated data dictionary. In some embodiments, the second data dictionary may be a data dictionary which was manually created at a previous point in time for the data accessed using the database query from which the automatically generated data dictionary was generated. In this regard, an older, manually created data dictionary for the data may be validated by automatically generating a new data dictionary using a database query for the particular project and comparing the automatically generated data dictionary to the older, manually-created data dictionary. As such, the apparatus 200 includes means, such as processor 202, memory 204, communications circuitry 20, input-output circuitry 208, and/or the like, for receiving a data dictionary.

Figure 5:
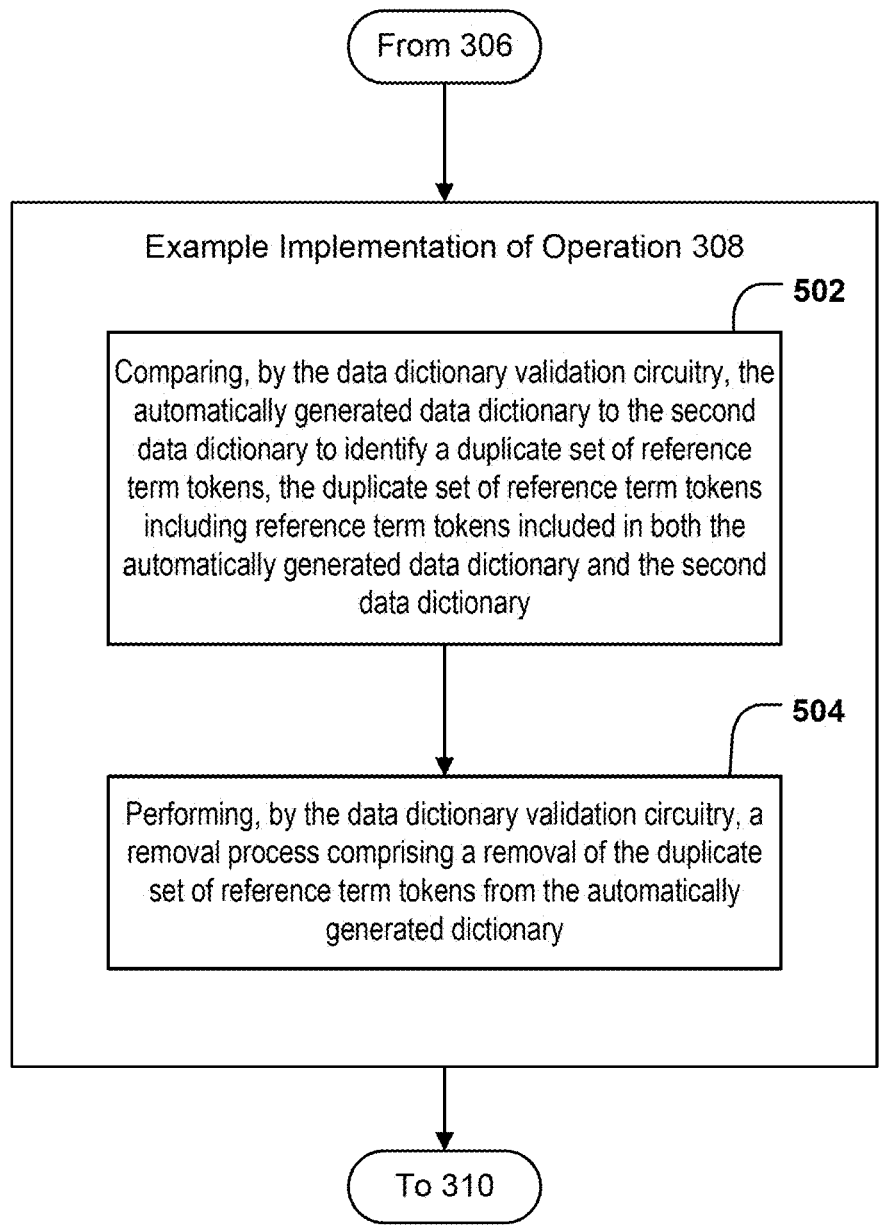
FIG. 5 illustrates an example flowchart for validating a data dictionary based on an automatically generated data dictionary, in accordance with some example embodiments described herein.

Turning to FIG. 5, example operations are shown for validating a second data dictionary based on an automatically generated data dictionary.

As shown by operation 502, the apparatus 200 includes means, such as processor 202, memory 204, data dictionary validation circuitry 212, or the like, for comparing the automatically generated data dictionary to the second data dictionary to identify a duplicate set of reference term tokens, the duplicate set of reference term tokens including reference term tokens included in both the automatically generated data dictionary and the second data dictionary.

For example, the data dictionary validation circuitry 212 may identify a respective reference term token in the automatically generated data dictionary (e.g., a corresponding data source name and field name in a respective entry) and analyze the second data dictionary to determine whether the second data dictionary comprises an entry having the corresponding data source name and field name. If the second data dictionary does not comprise the same reference term token as the automatically generated data dictionary, the data dictionary validation circuitry 212 continues on to identify additional reference term tokens and analyze the second data dictionary to determine whether the second data dictionary comprises the additional reference term tokens.

In some embodiments, the second data dictionary is analyzed for each identified reference term token in the automatically generated data dictionary. If it is determined that both the automatically generated data dictionary and the second data dictionary comprise a same reference term token, the reference term token may be temporarily stored in duplicate set of reference term tokens. As shown by operation 504, the apparatus 200 includes means, such as processor 202, memory 204, data dictionary validation circuitry 212, or the like, for performing, by the data dictionary validation circuitry, a removal process comprising a removal of the duplicate set of reference term tokens from the automatically generated dictionary. In this regard, all reference term tokens found in both the automatically generated data dictionary and the second data dictionary are removed from the automatically generated data dictionary. Upon the removal of the duplicate set of reference term tokens, if at least one reference term token remains in the automatically generated data dictionary, it may be determined that the second data dictionary is not valid such that the second data dictionary does not include reference to the at least one reference term token remaining in the automatically generated data dictionary. In this regard, when the second data dictionary was originally created manually, the creator failed to include a reference to the table or column associated with the at least one reference term token remaining in the automatically generated data dictionary.

Once the second data dictionary is analyzed with respect to each identified reference term token, a validation status of the second data dictionary may be determined. In this regard, the apparatus 200 includes means, such as processor 202, memory 204, data dictionary validation circuitry 212, or the like, for determining a validation status of a data dictionary. For example, the validation status may indicate an unsuccessful validation of the second data dictionary in an instance in which one or more reference term tokens remain in the automatically generated data dictionary upon completion of the removal process. In contrast, the validation status may otherwise indicate a successful validation of the second data dictionary. As another example, the validation status may indicate a successful validation of the second data dictionary in an instance in which no reference term tokens remain in the automatically generated data dictionary upon completion of the removal process, and may otherwise indicate an unsuccessful validation of the second data dictionary.

Returning to FIG. 3, at operation 310, the apparatus 200 includes means, such as processor 202, memory 204, communications circuitry 206, input-output circuitry 208, data dictionary validation circuitry 212, or the like, for causing presentation of a validation status of the second data dictionary. For example, an indication of a successful or unsuccessful validation of the second data dictionary may be presented visually at a user interface on a client device 112A. It is to be appreciated that the validation status may be presented in other manners, e.g., audibly through a speaker of the client device 112A, and/or the like.

In some examples, in instances in which a data dictionary is automatically generated using a database query as described above in connection with FIGS. 3, 4A, and 5, is may be beneficial to ensure the automatic generation of the data dictionary captured all necessary information from the database query.

Figure 6:
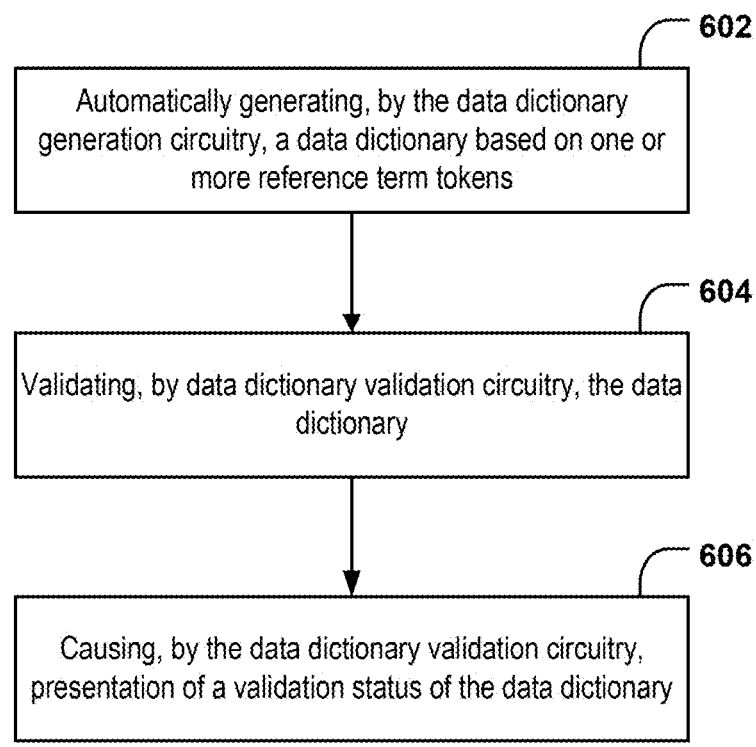
FIG. 6 illustrates an example flowchart for automated validation of an automatically generated data dictionary, in accordance with some example embodiments described herein.

Turning next to FIG. 6, example operations are shown for automated data dictionary validation.

As shown by operation 602 and as detailed above, the apparatus 200 includes means, such as processor 202, memory 204, data dictionary generation circuitry 210, or the like, for automatically generating a data dictionary based on one or more reference term tokens. For example, the automatic generation of the data dictionary may be carried out by operations 302-306 of FIG. 3 and operations 402-406 of FIG. 4A as detailed above.

In some embodiments, once a data dictionary is automatically generated by using a database query as described above, a subsequent automated validation of the automatically generated data dictionary may be performed. In this regard, as shown by operation 604, the apparatus 200 includes means, such as processor 202, memory 204, data dictionary validation circuitry 212, skeleton query generator 214, or the like, for validating the data dictionary.

Figure 7:
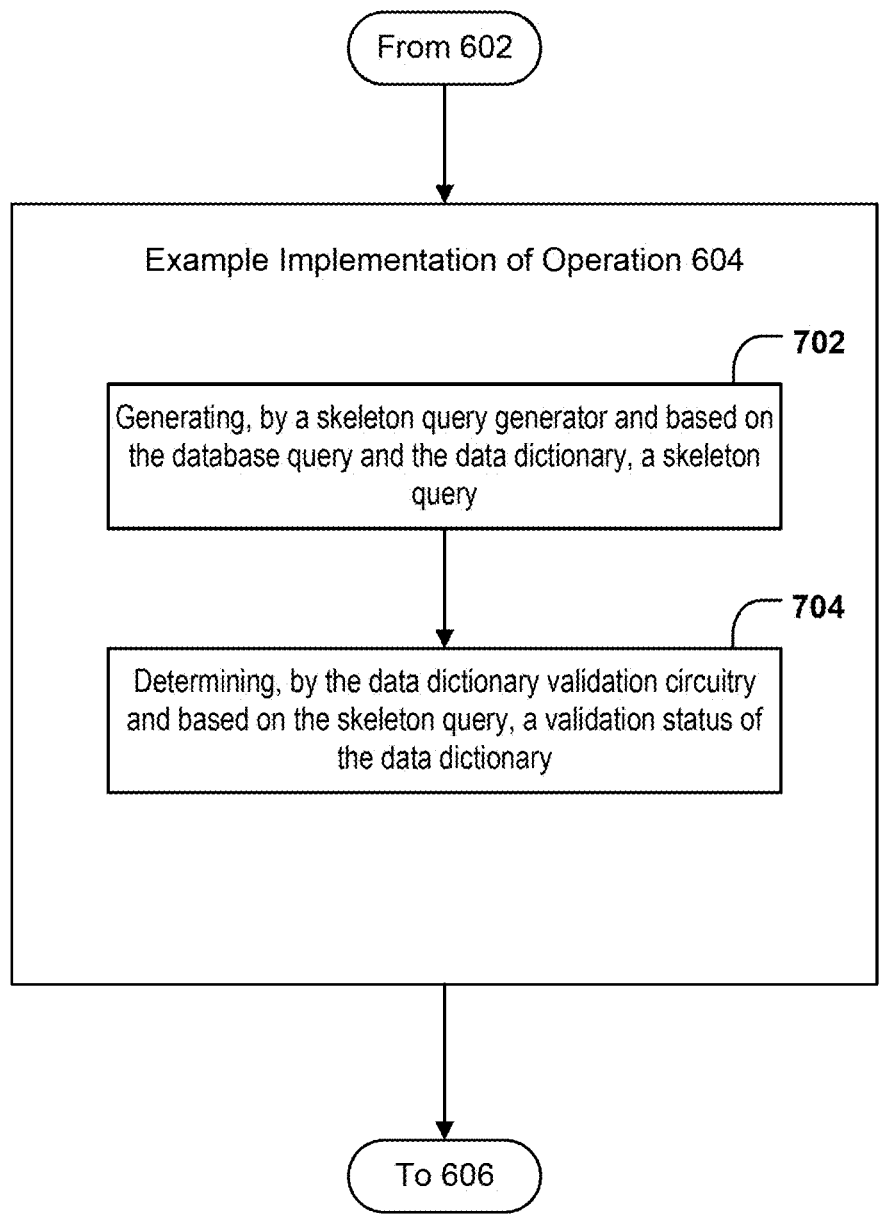
FIG. 7 illustrates an example flowchart for validating a data dictionary using a skeleton query, in accordance with some example embodiments described herein.

Turning briefly to FIG. 7, one set of example operations are shown for validating the data dictionary. In some embodiments, a data dictionary may be validated by using a skeleton query. In this regard, at operation 702, the apparatus 200 includes means, such as processor 202, memory 204, data dictionary validation circuitry 212, skeleton query generator 214, or the like, for generating, based on a database query and the data dictionary, a skeleton query.

In some embodiments, the generation of a skeleton query may employ a skeleton query generator 214 specifically configured to generate a skeleton query. In this regard, the apparatus 200 includes means, such as processor 202, memory 204, data dictionary validation circuitry 212, skeleton query generator 214, or the like, for removing a respective reference term token from the database query based on an identification of the respective reference term token in the data dictionary.

For example, for a respective reference term token, the skeleton query generator 214 may compare the database query and the automatically generated data dictionary to determine whether the respective reference term token is included in both the database query and the automatically generated data dictionary. If the respective term token is determined to be included in both the database query and the automatically generated data dictionary, the respective term token is then removed from database query, and the process continues on for each reference term token remaining in the database query. In this regard, after the process is completed for each reference term token, the resulting skeleton query would comprise only native term tokens if the data dictionary were valid. Said differently, if the automatically generated data dictionary includes all necessary information (e.g., all reference term tokens from the original database query), only native term tokens would remain in the skeleton query as all reference term tokens would be identified in both the database query and data dictionary and therefore removed from the database query. As one example, removing reference term tokens identified in both the database query and the data dictionary from the following database query:

SELECT Customer.name, Credit Info.credit score FROM Customer
JOIN Credit Info ON Credit Info.SSN=Customer.socsenum would result in the following skeleton query:
SELECT FROM
JOIN ON=

In some embodiments, the apparatus 200 includes means, such as processor 202, memory 204, communications circuitry 206, input-output circuitry 208, data dictionary validation circuitry 212, or the like, for causing presentation of the skeleton query. For example, the skeleton query may be visually presented at a user interface of a client device 112A. In this manner, a user, such as a database programmer, data scientist, and/or the like, may review the skeleton query to determine whether the automatically generated data dictionary is valid and contains all necessary information. For example, if the skeleton query were to retain one or more reference term tokens from an original database query, those one or more reference term tokens would readily stand out among the various native term tokens left in the skeleton query, thus allowing the user to quickly identify, based on the presence in the skeleton query of the one or more reference tokens, that information (e.g., the one or more reference tokens) is missing from the data dictionary.

In some embodiments, validating the automatically generated data dictionary may include removal of native term tokens from the database query. In this regard, the apparatus 200 includes means, such as processor 202, memory 204, data dictionary validation circuitry 212, skeleton query generator 214, or the like, for identifying a set of native term tokens in the database query.

For example, upon or during removal of reference term tokens from the database query to generate the skeleton query, the skeleton query generator 214 may also parse the database query to identify a set of native term tokens in the database query. The native term tokens may be identified, for example, based on a comparison of a respective native term token to a stored collection of known native term tokens. In this regard, the apparatus 200 includes means, such as processor 202, memory 204, data dictionary validation circuitry 212, skeleton query generator 214, or the like, for removing the set of native term tokens from the database query. In this regard, once identified in both the database query and the collection of known native term tokens, the respective native term token may be removed from the database query.

After the removal of reference term tokens identified in both the database query and the automatically generated data dictionary as well as all native term tokens, the resulting skeleton query may then be analyzed to provide automated validation of the automatically generated data dictionary by determining a validation status for the automatically generated data dictionary.

At operation 704, the apparatus 200 includes means, such as processor 202, memory 204, data dictionary validation circuitry 212, or the like, for determining, based on the skeleton query, a validation status of the data dictionary. In some embodiments, the validation status may be determined based on whether the skeleton query is empty. For example, the apparatus includes means, such as processor 202, memory 204, data dictionary validation circuitry 212, or the like, for determining whether the skeleton query is empty. The apparatus also includes means, such as processor 202, memory 204, data dictionary validation circuitry 212, or the like, for determining the validation status of the data dictionary based on the determination as to whether the skeleton query is empty.

For example, the validation status may indicate a successful validation of the data dictionary in an instance in which the skeleton query is determined to be empty. Likewise, the validation status may indicate an unsuccessful validation of the data dictionary in an instance in which the skeleton query is not empty (e.g., the skeleton query comprises one or more reference term tokens).

Finally, returning to FIG. 6, as shown by operation 606, the apparatus 200 includes means, such as processor 202, memory 204, communications circuitry 206, input-output circuitry 208, data dictionary validation circuitry 212, or the like, for causing presentation of a validation status of the data dictionary. For example, an indication of a successful or unsuccessful validation of the automatically generated data dictionary may be presented visually at a user interface on a client device 112A. It is to be appreciated that the validation status may be presented in other manners, e.g., audibly through a speaker of the client device 112A, and/or the like.

As described above, example embodiments provide methods and apparatuses that enable improved generation and validation of data dictionaries. Example embodiments thus provide tools that overcome existing problems faced by avoiding the need to manually generate and validate data dictionaries, example embodiments thus save time and resources, while also eliminating the possibility of human error that has been unavoidable in the past. Finally, by automating functionality that has historically required human analysis and intervention, the speed and consistency of the evaluations performed by example embodiments unlocks many potential new functions that have historically not been available, such as the ability to conduct near-real-time resolution when conclusions drawn from ML models regarding certain data challenges assumptions that have previously been made regarding said data.

As these examples all illustrate, example embodiments contemplated herein provide technical solutions that solve real-world problems faced during data dictionary generation and validation. And while the manual creation and validation of data dictionaries has been an issue for decades, the recently exploding amount of data made available by recently emerging technology today has made this problem significantly more acute, as the demand for data accuracy has grown significantly even while the complexity of various data applications such as artificial intelligence, machine learning, and/or the like have increased. Thus, example embodiments described herein represent a technical solution to these real-world problems.

FIGS. 3, 4A, and 5-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for automated data dictionary validation, the method comprising:
   automatically generating, by data dictionary generation circuitry, a data dictionary based on one or more reference term tokens of a database query, wherein automatically generating the data dictionary comprises:
      parsing, by the data dictionary generation circuitry, the database query, and
      identifying, by the data dictionary generation circuitry and based on the parsing of the database query, the one or more reference term tokens;
   validating, by data dictionary validation circuitry, the data dictionary, wherein validating the data dictionary includes:
      generating, by a skeleton query generator and based on the database query and the data dictionary, a skeleton query, wherein generating the skeleton query comprises:
         identifying, by the skeleton query generator, a set of native term tokens in the database query, wherein the one or more native term tokens are native to a programming language used to generate the database query,
         removing, by the skeleton query generator, the set of native term tokens from the database query, and
         removing a respective reference term token from the database query based on an identification of the respective reference term token in the data dictionary;
      determining, by the data dictionary validation circuitry, whether the skeleton query is empty, and
      determining, by the data dictionary validation circuitry and based on the determination as to whether the skeleton query is empty, a validation status of the data dictionary, wherein the validation status indicates a successful validation of the data dictionary in an instance in which the skeleton query is determined to be empty and an unsuccessful validation of the data dictionary in an instance in which the skeleton query comprises at least one of the one or more reference term tokens; and
   causing, by the data dictionary validation circuitry, presentation of the validation status.

2. An apparatus for automated data dictionary validation comprising:
   a processor; and
   data dictionary generation circuitry configured, with the processor, to:
      automatically generate a data dictionary based on one or more reference term tokens of a database query, wherein automatically generating the data dictionary comprises:
         parsing the database query, and
         identifying, based on the parsing of the database query, the one or more reference term tokens;
   a skeleton query generator configured, with the processor, to:
      generate, based on the database query and the data dictionary, a skeleton query, wherein generating the skeleton query comprises:
         identifying a set of native term tokens in the database query, wherein the one or more native term tokens are native to a programming language used to generate the database query,
         removing the set of native term tokens from the database query, and
         removing a respective reference term token from the database query based on an identification of the respective reference term token in the data dictionary; and
   data dictionary validation circuitry configured, with the processor, to:
      validate the data dictionary, wherein validating the data dictionary includes:
         determining whether the skeleton query is empty, and
         determining, based on the determination as to whether the skeleton query is empty, a validation status of the data dictionary, wherein the validation status indicates a successful validation of the data dictionary in an instance in which the skeleton query is determined to be empty and an unsuccessful validation of the data dictionary in an instance in which the skeleton query comprises at least one of the one or more reference term tokens; and
      cause presentation of the validation status.

3. A computer program product for automated data dictionary validation, the computer program product comprising at least one non-transitory computer-readable storage medium storing software instructions that, when executed, cause an apparatus to:
   automatically generate a data dictionary based on one or more reference term tokens of a database query, wherein automatically generating the data dictionary comprises:—
      parsing, by the data dictionary generation circuitry, the database query, and
      identifying, by the data dictionary generation circuitry and based on the parsing of the database query, the one or more reference term tokens; and
   validate the data dictionary, wherein validating the data dictionary includes:
      generating, based on the database query and the data dictionary, a skeleton query, wherein generating the skeleton query comprises:
         identifying a set of native term tokens in the database query, wherein the one or more native term tokens are native to a programming language used to generate the database query,
         removing the set of native term tokens from the database query, and
         removing a respective reference term token from the database query based on an identification of the respective reference term token in the data dictionary;
      determining whether the skeleton query is empty, and
      determining, based on the skeleton query, a validation status of the data dictionary, wherein the validation status indicates a successful validation of the data dictionary in an instance in which the skeleton query is determined to be empty and an unsuccessful validation of the data dictionary in an instance in which the skeleton query comprises at least one of the one or more reference term tokens; and cause presentation of the validation status.

4. The method of claim 1, further comprising:

causing, by the data dictionary validation circuitry, presentation of the skeleton query.

5. The apparatus of claim 2, wherein the data dictionary validation circuitry is further configured, with the processor, to:

cause presentation of the skeleton query.

6. The computer program product of claim 3, further comprising software instructions that, when executed, cause the apparatus to:

cause presentation of the skeleton query.

7. The method of claim 1, wherein the database query is a Structured Query Language (SQL) query.

8. The method of claim 1, further comprising, in response to the validation status indicating a successful validation of the data dictionary:

validating, by the data dictionary validation circuitry, a second data dictionary, wherein validating the second data dictionary comprises:

comparing, by the data dictionary validation circuitry, the data dictionary to the second data dictionary to identify a duplicate set of reference term tokens including reference term tokens included in both the data dictionary and the second data dictionary, and performing, by the data dictionary validation circuitry, a removal process comprising removal of the duplicate set of reference term tokens from the second data dictionary.

9. The method of claim 8, wherein the second data dictionary is a manually-created data dictionary that was generated prior to generation of the data dictionary.

10. The method of claim 1, wherein automatically generating the data dictionary further comprises:

converting, by the data dictionary generation circuitry, an alias indicated by a reference term token of the one or more reference term tokens in the database query to a data source name; and storing, by the data dictionary generation circuitry, the data source name in a data-source referencing field of the data dictionary.

11. The method of claim 1, wherein automatically generating the data dictionary further comprises:

identifying, by the data dictionary generation circuitry, that a reference term token of the one or more reference term tokens in the database query does not include a data source name; and storing, by the data dictionary generation circuitry, an indication of a missing data source name in a data-source referencing field of the data dictionary.

12. The apparatus of claim 2, wherein the database query is a Structured Query Language (SQL) query.

13. The apparatus of claim 2, wherein the data dictionary validation circuitry is further configured, with the processor, to, in response to the validation status indicating a successful validation of the data dictionary:

validate a second data dictionary, wherein validating the second data dictionary comprises:

comparing the data dictionary to the second data dictionary to identify a duplicate set of reference term tokens including reference term tokens included in both the data dictionary and the second data dictionary, and performing a removal process comprising removal of the duplicate set of reference term tokens from the second data dictionary.

14. The apparatus of claim 13, wherein the second data dictionary is a manually-created data dictionary that was generated prior to generation of the data dictionary.

15. The apparatus of claim 1, wherein automatically generating the data dictionary further comprises:

converting an alias indicated by a reference term token of the one or more reference term tokens in the database query to a data source name; and storing the data source name in a data-source referencing field of the data dictionary.

16. The apparatus of claim 1, wherein automatically generating the data dictionary further comprises:

identifying that a reference term token of the one or more reference term tokens in the database query does not include a data source name; and storing an indication of a missing data source name in a data-source referencing field of the data dictionary.

17. The computer program product of claim 3, wherein the data dictionary validation circuitry is further configured to, in response to the validation status indicating a successful validation of the data dictionary:

validate, by the data dictionary validation circuitry, a second data dictionary, wherein validating the second data dictionary comprises:

comparing the data dictionary to the second data dictionary to identify a duplicate set of reference term tokens including reference term tokens included in both the data dictionary and the second data dictionary, and performing a removal process comprising removal of the duplicate set of reference term tokens from the second data dictionary.

18. The computer program product of claim 17, wherein the second data dictionary is a manually-created data dictionary that was generated prior to generation of the data dictionary.

19. The computer program product of claim 1, wherein automatically generating the data dictionary further comprises:

converting an alias indicated by a reference term token of the one or more reference term tokens in the database query to a data source name; and storing the data source name in a data-source referencing field of the data dictionary.

20. The computer program product of claim 1, wherein automatically generating the data dictionary further comprises:

identifying that a reference term token of the one or more reference term tokens in the database query does not include a data source name; and storing an indication of a missing data source name in a data-source referencing field of the data dictionary.

* * * * *